Aug. 25, 1953      S. EPSTEIN      2,650,114
SHEET METAL PIPE AND FITTING CONNECTION
Filed Feb. 17, 1950
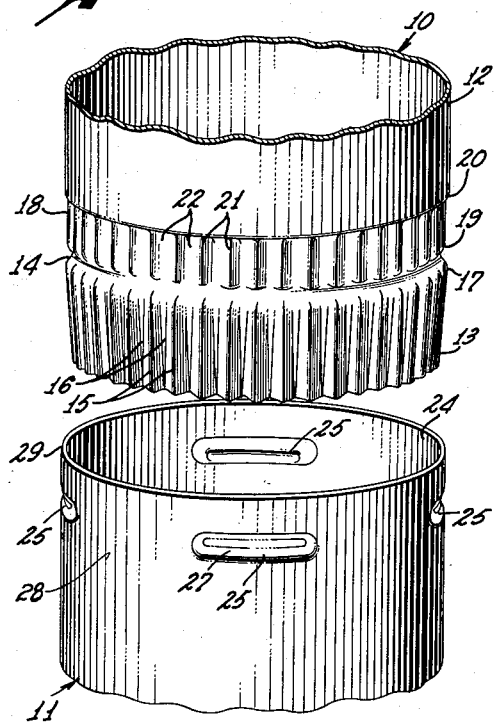
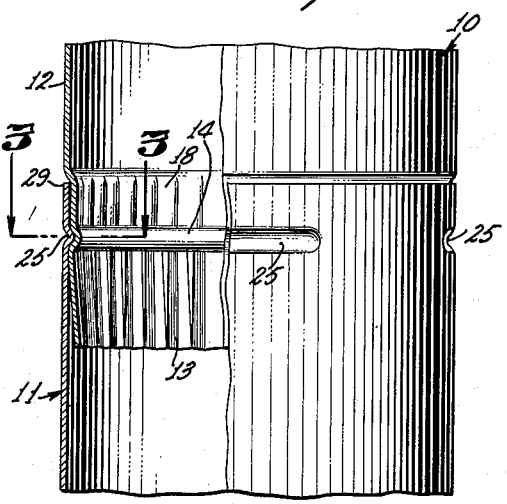
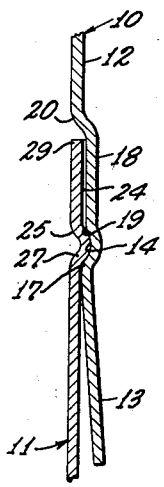
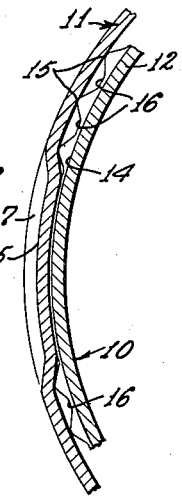
SAUL EPSTEIN,
*INVENTOR.*
HUEBNER, BEEHLER, WORREL,
HERZIG & CALDWELL,
*ATTORNEYS.*
BY Patented Aug. 25, 1953

2,650,114

UNITED STATES PATENT OFFICE 2,650,114

SHEET METAL PIPE AND FITTING CONNECTION

Saul Epstein, Los Angeles, Calif.

Application February 17, 1950, Serial No. 144,640

1 Claim. (Cl. 285—185)

This invention relates to a pipe and fitting connection and more particularly to a crimp lock preferably formed integrally with and for use on tapered sheet metal fittings and pipes.

It is intended by the instant construction to provide a new and improved crimped pipe connection between pipe sections and/or fittings.

Another object of the invention is the provision in crimped type pipe of a positive locking feature.

Another object of the invention is the provision in a new and improved crimped lock of the desired character described having a new and improved releasable construction.

Yet another object of the invention is the provision of a crimped lock construction permitting relative axial rotation of the joint parts when locked.

Another further object of the invention is the provision in a joint of the character described of a spring lock having positive locking and unlocking qualities.

Other specific objects of the invention include self-alining construction both by means of the crimp lock and/or by associated construction tending to keep the pipe and all fittings in axial alinement in the interlocked position of the parts.

It is furthermore among the objects of this invention to provide improvements over prior art, pipes, fittings and connections heretofore intended to accomplish generally similar purposes, including provision of new and improved means and methods for achieving the herein specified results.

Other and more specific objects and advantages will appear and be brought out more fully in the following specification considered with reference to the accompanying drawing throughout which like parts are designated by like numerals.

In the drawings—

Figure 1 is a fragmentary perspective view of adjacent interlockable pipe ends embodying this invention;

Figure 2 is a fragmentary side view of the adjacent pipe ends, parts being cut away, as interlocked in accordance with this invention;

Figure 3 is an enlarged sectional view taken as on a line 3—3 of Figure 2;

Figure 4 is an enlarged view in longitudinal section of a portion of the crimp-lock feature, as from the lefthand side of Figure 2, parts being cut away.

Referring more particularly to the drawings, there is shown by way of illustration but not of limitation, a male fitting or element such as a pipe section 10 and a female fitting or element such as another pipe section 11.

The male pipe 10, considered exclusively from the standpoint of the end illustrated, and without regard to the fact that the other end of said section may incorporate, e. g., a female end, preferably comprises a cylindrical conduit portion 12 preferably formed of sheet metal such as aluminum or iron having a crimped and tapered end 13.

Such tapered crimp end portion 13 is bounded inwardly by an annular groove 14. The ridges 15 and valleys 16 of the tapered crimp portion 13 stand out radially relative to the pipe 10 so as to form a shoulder 17 adjacent the groove 14.

A second annular crimped segment 18 forms a second shoulder 19 upon the inner side of the groove 14, and an abutment 20 offset radially outwardly from the crimped segment 18 defines a limit stop for the telescopic fit of the pipe 10 within the pipe 11. The crimped portion 18 is preferably untapered and the individual ridges 21 and valleys 22 thereof are in a preferably substantially parallel relationship to one another.

The ridges and valleys 15, 16, 21 and 22 are but need not necessarily be in alinement with one another, although they may be made so in the crimping process.

The tops of the ridges 21 collectively form an effective crimped pipe section having an external diameter preferably equal to or slightly less than the diameter of the tapered crimped portion 13 at the greatest diameter of the latter, i. e., at shoulder 17.

The pipe section or female fitting 11 may be of any shape corresponding to that of the male pipe 10, such as round, oval or the like. In any event, the end 13 of the pipe 10 slides into the end 24 of the pipe 11.

The part 24 is formed with circumferentially elongated inwardly directed intermittent beads 25. The walls 27 of the beads 25 tend to resist flexing as might change their arc of curvature due to the normal radial pressure exerted by the tapered portion 13 when the pipe 10 is telescoped into the pipe 11. The resistance of said walls is sufficient to cause temporary inward flexing of the corrugated portion 13, thereby resulting in a snap locking action when the pipes 10 and 11 are forced axially together, i. e., the beads 25 sliding over the shoulder 17 and snapping into the groove 14.

During such telescoping movement the springlock or snap action is assisted by the fact that the material circumferentially adjacent the intermittent beads, as at 28 flexes and flattens to a certain extent to permit the springlike insertion of the beads into the groove 14. The crimped end 13 likewise yields and flattens but to a lesser extent adjacent the shoulder 17 due to the reenforcing action of the walls of the groove 14. The flattening of the side wall portions 28 between the beads 25 temporarily distorts the pipe 11 from its normal round, oval or the like cross-sectional shape, but, due to the inherent resilience of the material of which the pipe is formed, once the dimples are engaged in the groove 14 such shape is promptly reestablished resulting in an undistorted fit of the telescoping parts. Such flexing construction and final relieved locking action avoids undue spreading of the female gap 24 and undue compression of the male fitting portions 13 and 18 of the pipe 10.

In addition, the abutment 20 together with such beads 25 and groove 14 establish a fixed interfitting position for the pipes so that the end 24 of the female fitting can not pass beyond the abutment 20.

As aforesaid, the crimped portion 18 as illustrated is generally cylindrical in external contour, the ridges and grooves thereof being parallel. The lip of the female pipe normally overlies the corrugated portion 18 and due to the corresponding cylindrical or other symmetry of the parts a parallel relationship of the lip to the crimped portion 18 retains the pipes in a desired condition of alinement such as would not be obtained if sole reliance were placed upon the usual conventional frictional engagement of the end 24 of the pipe 11 with the tapered portion 13 of the pipe 10. The parallel-fluted portion 18, in the telescoped position of the pipes, makes a contiguous, preferably touching, fit within the lip 29.

If desired, the annular groove 14 can be replaced by a segmental groove adapted to receive the beads 25 but to restrain rotation of the pipes 10 and 11 thereby. Moreover, the tapered portion 13 can be tapered continuously or at variant angles between the lower end of the pipe 10, as shown, and the abutment 20, which likewise may be, but preferably is not, omitted; that is to say, the portion 19 can be tapered at an angle either corresponding to or differing from the portion 18. And the groove 14 may replace the abutment 20, omitting the portion 18 and relying on the groove 14 and beads 25 above for holding the pipes in alinement. Also, the crimp can be omitted, but the desired snap and resilience of the locking action will thereby suffer.

By the instant construction any desired number or shape of beads and any desired shape of the groove 14 can give any desired degree of locking. The strength of the snap action resulting in the desired spring-lock is controlled as by the depth of the fluting or crimp, and the ease or difficulty of installation and removal of the parts from one another may be controlled by the height of the shoulder 17, the thickness of the pipe and/or fitting material, the distance between the beads circumferentially, and the cross-sectional shape or angle of the groove 14.

Preferably during fabrication grooves and crimps are formed simultaneously. The beads may be formed in flat or in round stock.

This invention features the provision of new and improved construction for joining sheet metal or the like with pipes and fittings. It likewise features new and improved spring-lock construction preferably associated with a crimp pipe and included self-alining interfitting construction, the resultant joint being secure, capable of rotation, if desired, and whose connection suffices to overcome substantially any desired degree axially directed force tending to unlock the same.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claim so as to embrace any and all equivalent structures.

Having thus described my invention, what I claim as new and desire to secure by Letters Patent is:

A slidable, telescoping and releasable pipe joint comprising: a first substantially cylindrical sheet metal pipe comprising an unbroken sheet metal wall of some resilience, having a crimped end portion comprising longitudinally extending alternate ridges and grooves disposed entirely therearound, the outermost part of said crimped end being tapered and an innermost part of said crimped end defining an annular wall part essentially parallel to the axis of the pipe, and an annular offset at the innermost edge of said innermost part offset inwardly circumferentially of said pipe, the tops of the ridges of said innermost part of said crimped portion defining a diameter approximately equal to that of the general inside diameter of the pipe, said innermost and outermost parts of said crimped end portion being spaced apart by an external annular groove extending entirely around said pipe in unbroken continuity between said parts, and a second substantially annular sheet metal pipe having an unbroken wall, said second pipe having an end with a plurality of circumferentially spaced, circumferentially elongate, inwardly directed dimples each of a length to comprehend a plurality of said ridges, said dimples being spaced inwardly from said end of said second pipe a distance corresponding to that between said offset on said first mentioned pipe and said annular groove, the end of said first mentioned pipe being adapted for insertion into the end of said second pipe whereby said dimples are adapted to ride over the ridges of said tapered part of said crimped portion, deflecting the same inwardly at said dimples and bulging same outwardly between said dimples while causing said second pipe end to become relatively flattened between said dimples, said first and second pipe ends being resiliently returned to their normal substantially cylindrical contour when said dimples are engaged in said groove and the end of said second pipe is in abutting relationship against said inward offset of said first pipe.

SAUL EPSTEIN.

References Cited in the file of this patent

UNITED STATES PATENTS

| Number | Name | Date |
|---|---|---|
| 580,222 | Record | Apr. 6, 1897 |
| 587,695 | Billing et al. | Aug. 10, 1897 |
| 643,005 | Record | Feb. 6, 1900 |
| 1,086,312 | Blaha | Feb. 3, 1914 |
| 1,209,008 | Messina | Dec. 19, 1916 |
| 1,315,904 | Bever | Sept. 9, 1919 |
| 1,661,674 | Osborn | Mar. 6, 1928 |
| 1,686,254 | Rachlin | Oct. 2, 1928 |

FOREIGN PATENTS

| Number | Country | Date |
|---|---|---|
| 221 | Great Britain | Jan. 5, 1914 |
| 404,941 | Germany | Oct. 27, 1924 |